(12) United States Patent
Borsato et al.

(10) Patent No.: US 6,895,511 B1
(45) Date of Patent: May 17, 2005

(54) METHOD AND APPARATUS PROVIDING FOR INTERNET PROTOCOL ADDRESS AUTHENTICATION

(75) Inventors: Larry W. Borsato, Ottawa (CA); Mark Gaudet, Ottawa (CA); Ian Hamilton, Ottawa (CA); Rod Anderson, Ottawa (CA); Glenn Waters, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/314,601

(22) Filed: May 19, 1999

Related U.S. Application Data

(63) Continuation-in-part of application No. 09/182,944, filed on Oct. 29, 1998, now Pat. No. 6,654,891.

(51) Int. Cl.$^7$ ............ H04L 9/00; G06F 13/00; G06F 12/14
(52) U.S. Cl. ................................. 713/201
(58) Field of Search ............ 713/201, 200, 713/202; 370/352, 401; 709/228, 220, 222, 245, 225, 227, 217, 229, 223, 226

(56) References Cited

U.S. PATENT DOCUMENTS

| | | | |
|---|---|---|---|
| 5,553,234 A | * | 9/1996 | Cotner et al. .................. 714/16 |
| 5,689,633 A | * | 11/1997 | Cotner et al. .................. 714/16 |
| 5,812,819 A | * | 9/1998 | Rodwin et al. ............... 703/23 |
| 5,884,024 A | * | 3/1999 | Lim et al. .................... 713/201 |
| 6,009,103 A | * | 12/1999 | Woundy ..................... 370/401 |
| 6,026,445 A | * | 2/2000 | Kephart et al. ............. 709/245 |
| 6,070,242 A | * | 5/2000 | Wong et al. ................. 713/201 |
| 6,131,164 A | * | 10/2000 | Parker ........................ 713/201 |
| 6,351,536 B1 | * | 2/2002 | Sasaki ......................... 380/44 |
| 6,460,141 B1 | * | 10/2002 | Olden ......................... 713/201 |

FOREIGN PATENT DOCUMENTS

EP   0998099   5/2000

OTHER PUBLICATIONS

M. Wahl, A Summary of the X.500(96) User Schema for use with LDAPv3, Dec. 1, 1997, 38.
M. Wahl et al., Lightweight Directory Access Protocol (v3), Dec. 1997, 59 pages.
R. Droms, Authentication for DHCP Messages, Nov. 1996, 10 pages.
P. Vixie et al., Dynamics Updates in the Domain Name System (DNS Update), Apr. 1997, 31 pages.
Kobayashi K. et al., "Network Access Control for DHCP Environment" IEICE Transactions on Communications, Institute of Electronics Information & Comm. Eng. Tokyo, JP, vol. E81–B, No. 9, Sep. 1, 1998.
Chul–Jin Park et al., "The Improvement for Integrity between DHCP and DNS" Proceedings. High Performance Computing on The Information Superhighway, Apr. 28, 1997.

* cited by examiner

*Primary Examiner*—Ly V. Hua
(74) *Attorney, Agent, or Firm*—Blakely Sokoloff Taylor & Zafman LLP

(57) ABSTRACT

A method and apparatus for storage of user identifier/IP address pairs in a network. The network includes a DHCP server for assigning IP addresses to computer and other devices in the network, a device (such as a computer) coupled to receive an IP address from the DHCP server, an authentication server coupled with the device for receiving user identifier/IP address pairs from the device and authenticating the user, and a directory server coupled to receive authenticated user identifier/IP address pairs from the authentication server.

26 Claims, 3 Drawing Sheets

METHOD AND APPARATUS PROVIDING FOR INTERNET PROTOCOL ADDRESS AUTHENTICATION

CROSS REFERENCE TO RELATED APPLICATIONS

This application is a continuation-in-part of U.S. patent application Ser. No. 09/182,944 titled "Trusted Network Binding Using LDAP Lightweight Directory Access Protocol" filed Oct. 29, 1998, now U.S. Pat. No. 6,654,891.

BACKGROUND OF THE INVENTION

An IP address (also called an IP number) is a number (typically written as four numbers separated by periods, i.e. 107.4.1.3 or 84.2.1.111) which uniquely identifies a computer that is making use of the Internet. It is analogous to your telephone number in that the telephone network directs calls to your telephone using your telephone number. The IP address is used by the Internet to direct data to your computer, e.g. the data your web browser retrieves and displays when you surf the net.

It is important that each computer accessing the internet (or an intranet) has a unique IP address. One method of doing this is for a network administrator to individually assign an IP address to each computer that will make use of the network. This is a relatively cumbersome task especially in networks supporting a large number of computers. The task is complicated by the fact that if computers move to another location in another part of the network, a new IP address must be entered.

(Dynamic Host Configuration Protocol) (DHCP) is a protocol that lets network administrators manage centrally and automate the assignment of IP addresses in an organization's network. DHCP essentially lets a network administrator supervise and distribute IP addresses from a central point and automatically sends a new IP address when a computer is plugged into a different place in the network. The DHCP server grants the computer a period of time to use the IP address. This period of time is called the DHCP lease period. (It should be noted that this application has referred to computers but any number of other devices could be connected to a network and be assigned IP addresses—such devices might be referred to generically simply as devices and, when receiving an IP address from a DHCP server, as DHCP clients.)

Of course, from the standpoint of network management, this eases the burden on the network administrator significantly. Unfortunately, there is no longer a one-to-one association between particular computers and IP addresses.

DHCP does provide an authentication mechanism essentially by denying a user an IP address until the user has been authenticated. Thus, only users authorized to receive an IP address from the particular DHCP server will receive one. In essence, the user is authenticated. However, no mechanism is provided to applications to look up user identifiers based on known IP addresses or to look up IP addresses based on known user identifiers.

With the advent of certain technologies, such as Voice over IP and policy enabled networking, it would be useful to provide a trusted association between IP addresses and particular computers (and, even particular users). In these applications, routing and bandwidth considerations are based on source and destination addresses. These decisions require authenticated addresses; therefore, DHCP authentication of users is not an effective way to decide which users will get access to network services.

Thus, what is desired is an improved method and apparatus for authenticating computers/user and IP address pairs.

Directories of network users exist. For example, email systems typically include their own directories. The CCITT has adopted X.500 as a standard for directories on networks using TCP/IP networks. X.500 has been criticized as being too large. More recently, the Lightweight Directory Access Protocol (LDAP) has been proposed. The original specifications for LDAP were set forth in RFC 1487. More recently, LDAPv2 was defined in RFC 1777 and even more recently LDAPv3 has been defined in RFC 1487.

These directories include much information about network users. RFC 2256 provides a list of attributes to be stored in a standard LDAPv3 database. The LDAPv3database schema includes, for example, business names, post office addresses, telephone information, etc. However, the included information is relatively static information.

What is needed is to include dynamic information in a LDAP directory including, by way of example, IP address information.

SUMMARY OF THE INVENTION

A method and apparatus for authenticating user/internet protocol (IP) address pairs comprising binding a user identifier with an assigned internet protocol address. The bound user/IP address is stored for retrieval by applications desiring to authenticate users based on their IP address.

Figure 1:
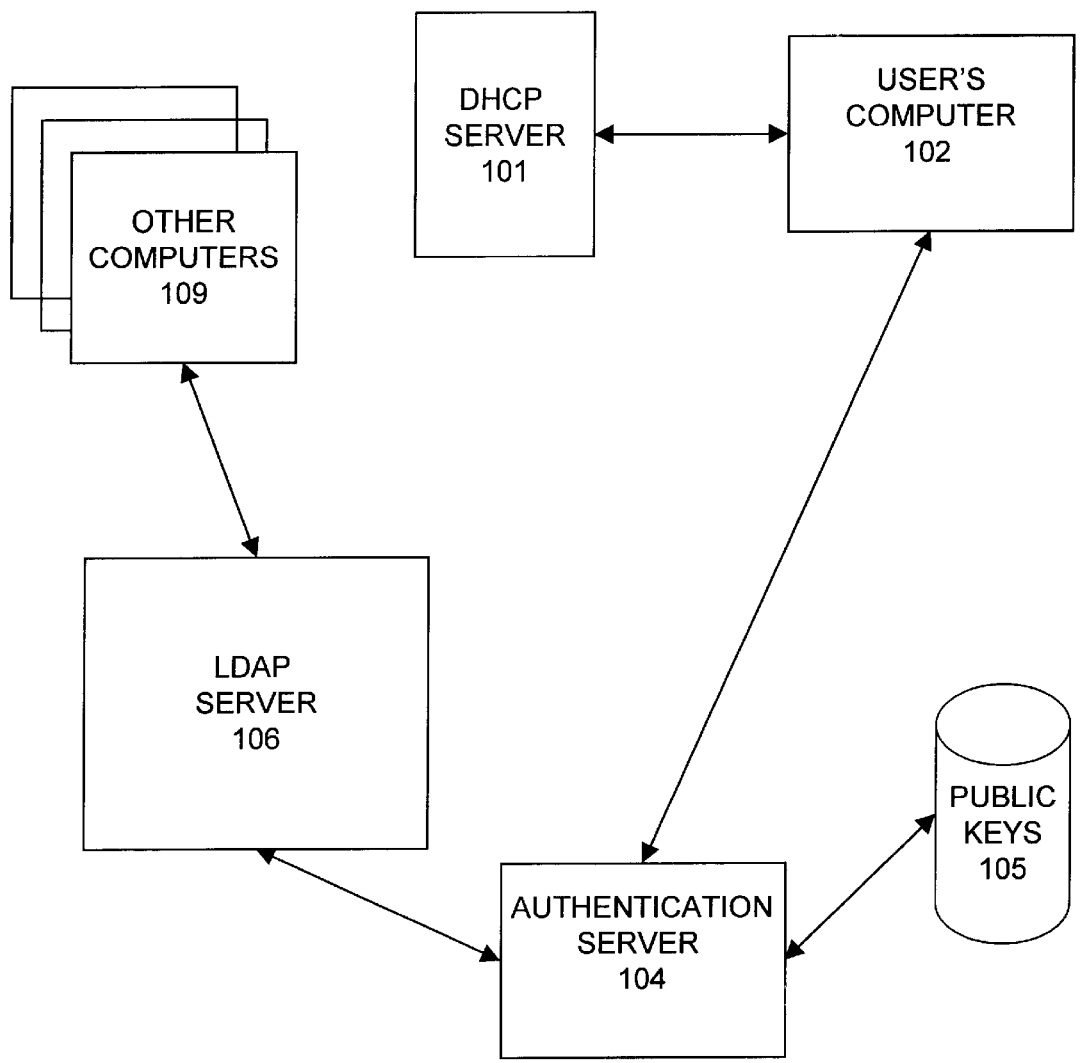
FIG. 1 is an overall diagram illustrating a network as may implement an embodiment of the described invention.
Figure 3:
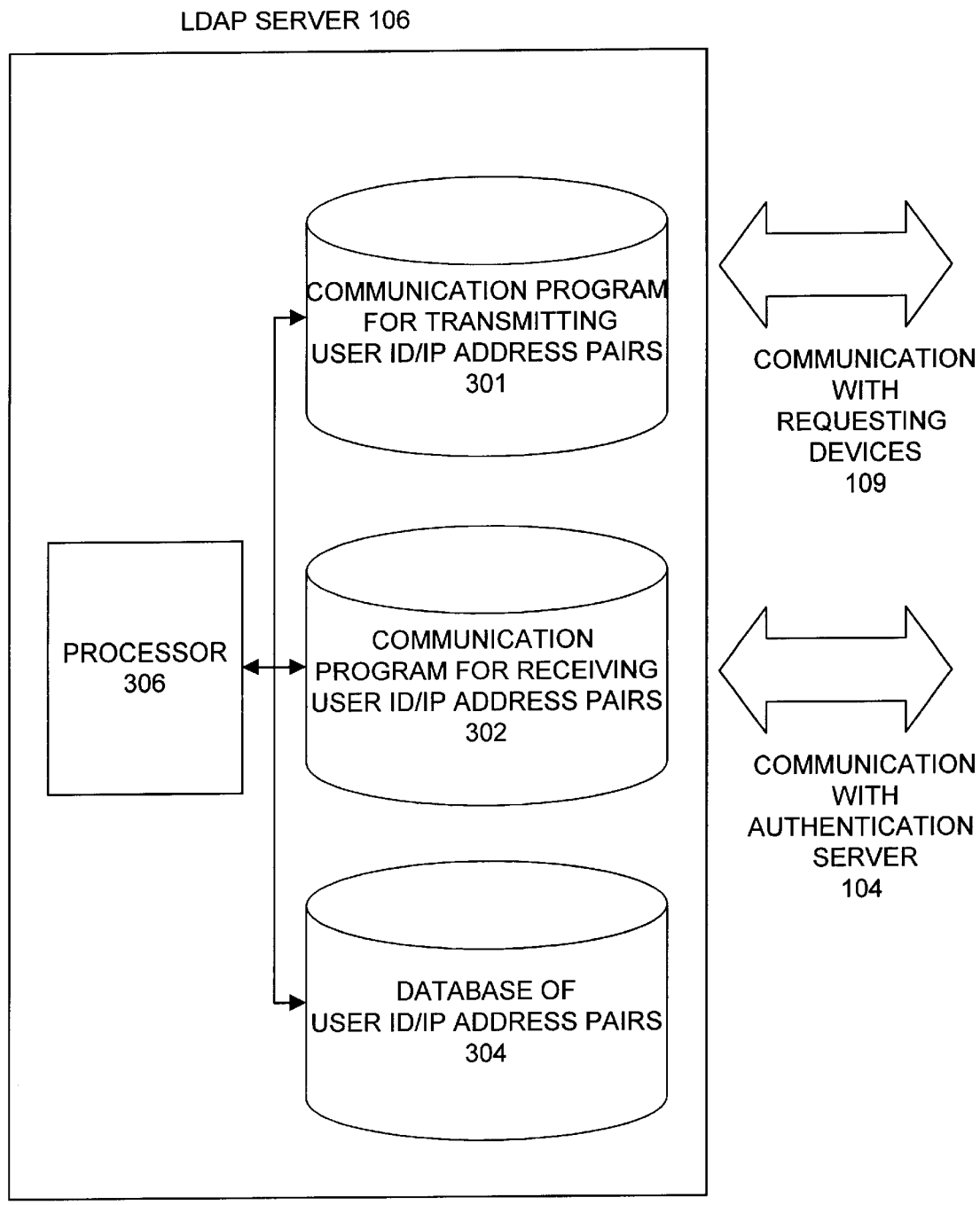
FIG. 3 is a high level block diagram of a Lightweight Directory Access Protocol server as may be utilized in embodiments of the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS OF THE PRESENT INVENTION

Figure 2:
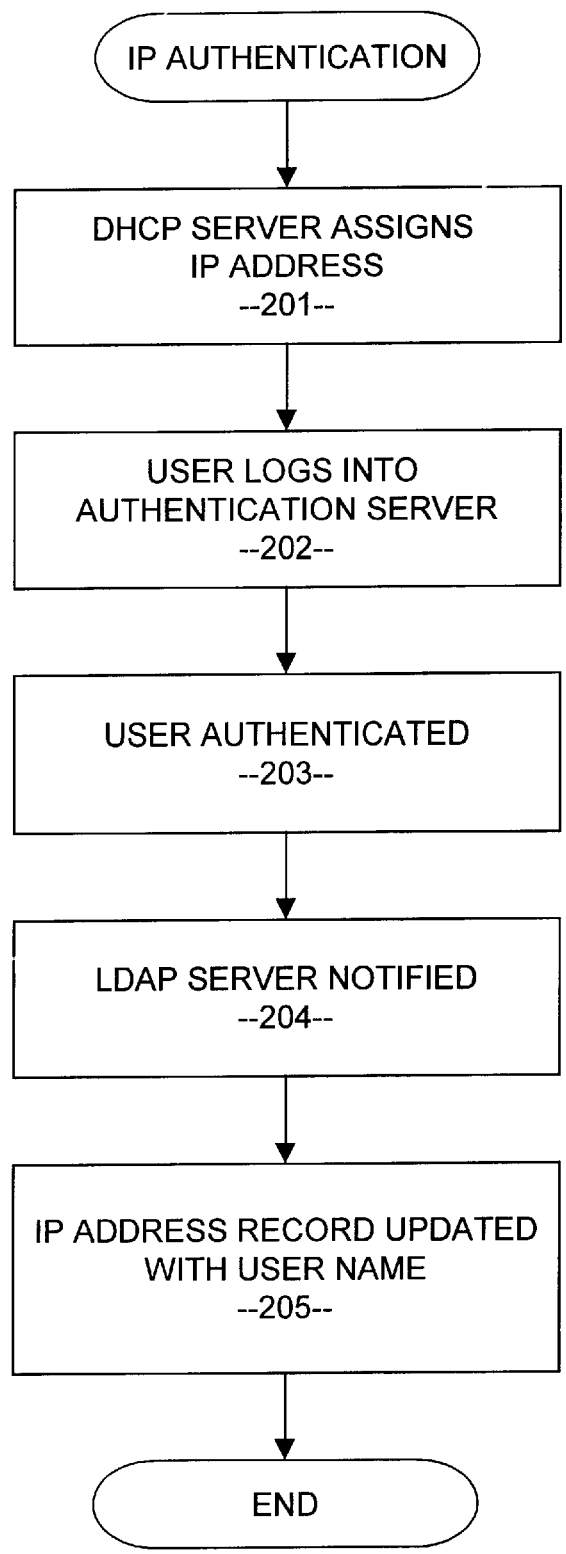
FIG. 2 is a overall flow diagram illustrating a method of an embodiment of the present invention.

Turning first to FIG. 1, an overall diagram illustrating a network as may implement an embodiment of the present invention is provided. It will be worthwhile to describe FIG. 1 in conjunction with FIG. 2 which illustrates a method of an embodiment of the invention. In FIG. 1, a user's computer 102 is illustrated. The user's computer 102 initiates a DHCP request to DHCP server 101 to obtain an IP address. The DHCP server 101 assigns an IP address to the user's computer 102, block 201. This processing follows standard DHCP processing and will be not be described in greater detail except to note that this processing may be carried out using authenticated DHCP processing as was mentioned above in the background section. It should also be noted that, in the described embodiment, the user receives an IP address via DHCP. However, in alternate embodiments, the IP address may be received by alternative means (such as by being directly assigned by a network administrator) without departure from the spirit and scope of the present invention. What is important is that there exists a user/IP address pair to be stored.

It should be noted that, particularly when assigned by a DHCP server, the IP address is relatively dynamic. The present invention may have application with respect to storage of other dynamic information and binding the dynamic information with a user identifier by storing in the information in a LDAP or other database.

It should also be noted that the various connections illustrated on FIG. 1, including for example the connection between the user's computer 102 and the DHCP server 102, may be direct connections as illustrated. More commonly, these connections will be made through a network such as the internet using TCP/IP as the transport protocol.

The user then logs into an authentication server 104, block 202. This log-in process may utilize some simple identification of the user (such as by the user simply providing a log in user identifier) or may use any level of more sophisticated security ranging from simple password security to use of secure encryption for the session.

In one embodiment, the user logs in to the authentication server 104 using a web page which allows the user to provide both a user identifier and a password. Messages sent to the authentication sever 104 will include the user identifier, password and the IP address assigned to the user's computer 102. In an alternative embodiment, the user may store on the computer 102 both a user identifier ("user id") and password. The computer 102 may be programmed to automatically provide the stored user identifier, password and IP address to the authentication server 104. This programming may be accomplished, for example, by downloading a JAVA™ Applet. Of course, storing the user's password directly on the computer 102 provides security implications. Therefore, in alternative embodiments, the user may provide this information at initial log-in to the computer 102 (as is common in many computer environments) rather than storing it permanently on the computer 102.

The authentication server 104 authenticates the user as an authorized user, step 203. This process may include retrieving the user's public key from a public key database 105 if the session is an encrypted session.

After the user is authenticated, block 203, the authentication server 104 notifies a Lightweight Directory Access Protocol (LDAP) server 106, block 204. The LDAP server 106 stores the user identifier/IP address pair, block 205. The session between the authentication server 104 and the LDAP server 106 may be authenticated in order to provide for security of this transaction. Alternatively, both processes may execute on the same hardware platform in certain embodiments.

The information in the LDAP server may then be used by various applications executing on computers 109 which require authenticated user id/IP address information.

As will be appreciated, the authentication of the user id and IP address pair known to be valid only at the instant of authentication. In certain embodiments, it may be useful to provide for a time out or other mechanism which requires the user to re-authenticate after some event (such as the expiration of a period of time).

Turning briefly to FIG. 3, a high level block diagram illustrating components of the LDAP server 106 is shown. The LDAP server 106 comprises a database of authenticated user id/IP address pairs 304. These pairs have, in the described embodiment, been received from the authentication server 104 using a communication program 302 executed on processor 306 for receiving the user identifier/IP address pairs. Applications executing on requesting devices 109 may request access to the user id/IP address pairs 304 by using communication program 301.

Certain implementations may not require security. In such implementations, aspects of the present invention may be implemented without requirement for use of the authentication techniques discussed above. Therefore, the present application may refer to the authentication server 104 simply as a binding server. The binding server and LDAP server (or other database) may be referred to collectively as a "binding system" which serves to associate a user identifier with dynamic information about the user (such as an IP address) and store the information in a data store.

Thus, what has been disclosed is a method and apparatus for authenticating users/internet protocol (IP) address pairs.

What is claimed is:

1. A method of binding a user with an internet protocol address comprising:
   a) connecting the user with a binding system and identifying a user identifier and an internet protocol address to be used by the user;
   b) storing the user identifier/internet protocol address pair in a data store using the binding system.

2. The method as recited by claim 1 wherein the connection with the binding system is a secure connection.

3. The method as recited by claim 1 wherein prior to identifying the user, the method further comprises issuing a registration request to the binding system, the registration request including the user identifier and a password.

4. The method as recited by claim 3 wherein the registration request is made using HTTP as the transport protocol.

5. The method as recited by claim 1 wherein the internet protocol address was assigned to the user by a dynamic host configuration protocol (DHCP) server.

6. The method as recited by claim 1 wherein the binding system comprises a combination of a lightweight directory access protocol (LDAP) data store and an authentication server.

7. The method as recited by claim 6 wherein the authentication server authenticates the user before storing the user identifier/internet protocol address pair.

8. A server for use in authentication of user identifier/internet protocol address pairs comprising:
   a) a first data store having stored therein an authenticated user identifier/internet protocol address pair; and
   b) a second data store having stored therein a program which when executed on a processor retrieves the authenticated user identifier/internet protocol address pair and transmits the pair to a requesting device.

9. The server as recited by claim 8 wherein the server further comprises a third data store having stored therein a program which when executed on a processor stores authenticated user identifier/internet protocol address pairs received from an authentication server.

10. The server as recited by claim 9 wherein the authentication server communicates over an encrypted communication channel with the server.

11. A method of providing authenticated user identifier/IP address pairs comprising:
   a) a first device communicating with a dynamic host configuration protocol (DHCP) server to have an IP address assigned to the first device;
   b) the first device communicating with an authentication server a user identifier and the IP address;

c) the authentication server authenticating the user;

d) the authentication server communicating to a directory server a user identifier/IP address pair; and e) the directory server storing the user identifier/IP address pair.

12. The method as recited by claim 11 wherein the authentication server authenticates the user by use of a user identifier and password supplied by the computer.

13. The method as recited by claim 11 wherein the communication between the computer and the authentication server is encrypted.

14. The method as recited by claim 11 wherein the user identifier/IP address pair is communicated from the authentication server to the directory server over an encrypted channel.

15. The method as recited by claim 11 wherein the authentication server executed on the same hardware platform as the directory server.

16. A network comprising:

a) a dynamic host configuration protocol (DHCP) server;

b) a computer coupled in communication with the DHCP server over the network;

c) an authentication server coupled in communication over the network with the computer, the authentication server for authenticating a user using the computer based on a user identifier communicated from the computer; and d) a directory server coupled in communication with the authentication server, the directory server receiving and storing authenticated user identifier/IP address pairs from the authentication server.

17. The network as recited by claim 16 wherein the communication channel between the computer and the authentication server is an encrypted communication channel.

18. The network as recited by claim 16 wherein the communication channel between the authentication server and the directory server is an encrypted communication channel.

19. The network as recited by claim 16 wherein the authentication server and the directory server execute on the same hardware platform.

20. The network as recited by claim 16 further comprising requesting devices coupled in communication with the directory server for requesting authenticated user identifier/IP address pairs.

21. A network comprising a dynamic host configuration protocol (DHCP) server for assigning IP addresses to computer and other devices in the network, a device coupled to receive an IP address from the DHCP server, an authentication server coupled with the device for receiving user identifier/IP address pairs from the device and authenticating the user, and a directory server coupled to receive authenticated user identifier/IP address pairs from the authentication server.

22. A lightweight directory access protocol (LDAP) server comprising:

a first data store having stored therein an user identifier/internet protocol address pair; and a second data store having stored therein a program which when executed on processor retrieves the user identifier/internet protocol address pair and transmits the pair to a requesting device.

23. The LDAP server as recited by claim 22 wherein the server further comprises a third data store having stored therein a program which when executed on a processor stores user identifier/internet protocol address pairs received from an binding server.

24. A lightweight directory access protocol (LDAP) server comprising:

a first data store having stored therein an user identifier and dynamic information related to the user identifier; and a second data store having stored therein a program which when executed on processor retrieves the user identifier and dynamic information and transmits the information to a requesting device.

25. The LDAP server as recited by claim 24 wherein the server further comprises a third data store having stored therein a program which when executed on a processor stores dynamic information related to a user identifier in the first data store.

26. The LDAP server as recited by claim 24 wherein the dynamic information is an internet protocol address.

* * * * *